United States Patent
Morita et al.

(10) Patent No.: US 11,282,168 B2
(45) Date of Patent: Mar. 22, 2022

(54) IMAGE PROCESSING APPARATUS, IMAGE PROCESSING METHOD, AND PROGRAM

(71) Applicant: SONY INTERACTIVE ENTERTAINMENT INC., Tokyo (JP)

(72) Inventors: Satoshi Morita, Chiba (JP); Masakazu Hayashi, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 203 days.

(21) Appl. No.: 16/651,047

(22) PCT Filed: Oct. 23, 2017

(86) PCT No.: PCT/JP2017/038140
§ 371 (c)(1),
(2) Date: Mar. 26, 2020

(87) PCT Pub. No.: WO2019/082232
PCT Pub. Date: May 2, 2019

(65) Prior Publication Data
US 2020/0258194 A1    Aug. 13, 2020

(51) Int. Cl.
*G06T 3/40* (2006.01)
*H04N 9/07* (2006.01)
*H04N 9/04* (2006.01)

(52) U.S. Cl.
CPC ....... *G06T 3/4015* (2013.01); *H04N 9/04515* (2018.08); *H04N 9/07* (2013.01)

(58) Field of Classification Search
CPC ..... G06T 3/4015; H04N 9/04515; H04N 9/07
See application file for complete search history.

(56) References Cited

U.S. PATENT DOCUMENTS 9,219,870 B1 * 12/2015 Mills ............... G06T 3/4015
9,232,203 B2 * 1/2016 Sawada ............... H04N 9/07
(Continued)

FOREIGN PATENT DOCUMENTS

JP    2003-87810 A    3/2003
JP    2007195024 A    8/2007
(Continued)

OTHER PUBLICATIONS

International Preliminary Report on Patentability dated May 7, 2020, from International Patent Application No. PCT/JP2017/038140, 11 sheets.
(Continued)

*Primary Examiner* — Brian P Yenke
(74) *Attorney, Agent, or Firm* — Katten Muchin Rosenman LLP

(57) ABSTRACT

Provided are an image processing apparatus, an image processing method, and a program that can highly efficiently execute a generation process of a color image based on an image including a plurality of pixel sets each including a plurality of single-color pixels arranged in a predetermined color pattern, in which the pixel sets are vertically and horizontally arranged side by side. An intermediate image generation unit (64) generates, based on a basic image, an intermediate image in which pixel values of a plurality of basic pixels included in the pixel set are set as values of intermediate pixel data of one intermediate pixel associated with the pixel set. A pixel value determination unit (70) determines pixel values of a plurality of colors of at least one final pixel associated with a target intermediate pixel based on values of the intermediate pixel data of the target intermediate pixel and values of the intermediate pixel data of the intermediate pixel adjacent to the target intermediate pixel. A final image generation unit (72) generates a final image
(Continued)

based on pixel values of a plurality of colors of a plurality of final pixels.

8 Claims, 12 Drawing Sheets

(56) References Cited

U.S. PATENT DOCUMENTS

| | | | |
|---|---|---|---|
| 9,418,398 B2* | 8/2016 | Elliott | G09G 5/02 |
| 9,967,527 B2* | 5/2018 | Sekiguchi | H04N 9/04515 |
| 10,109,037 B1* | 10/2018 | Huang | G06T 7/13 |
| 10,277,803 B2* | 4/2019 | Wei | H04N 5/23229 |
| 10,306,196 B2* | 5/2019 | Tanaka | H04N 9/07 |
| 10,438,321 B2* | 10/2019 | Wei | G06T 3/4015 |
| 10,638,037 B2* | 4/2020 | Shionoya | H04N 9/04557 |
| 10,735,700 B2* | 8/2020 | Dabral | G06T 3/4015 |
| 10,825,136 B2* | 11/2020 | Yamaguchi | H04N 5/23229 |
| 10,848,730 B2* | 11/2020 | Buettner | H04N 9/045 |
| 10,853,913 B2* | 12/2020 | Chuang | G02B 5/201 |
| 10,863,149 B2* | 12/2020 | Ioka | H04N 9/083 |
| 10,951,866 B2* | 3/2021 | Yamashita | H04N 9/646 |
| 11,100,375 B2* | 8/2021 | Lee | G06T 5/001 |
| 2008/0122946 A1* | 5/2008 | Sung | H04N 9/04515 348/224.1 |
| 2013/0155272 A1* | 6/2013 | Imade | G06T 3/4007 348/222.1 |
| 2015/0042775 A1* | 2/2015 | Zhao | H04N 9/04515 348/71 |
| 2016/0260197 A1* | 9/2016 | Hada | G06T 5/006 |
| 2019/0132535 A1* | 5/2019 | Lee | G06T 5/20 |
| 2019/0318452 A1* | 10/2019 | Oh | G06T 5/002 |
| 2021/0217134 A1* | 7/2021 | Okamura | G06T 5/20 |
| 2021/0248758 A1* | 8/2021 | Li | G06T 7/248 |
| 2021/0287349 A1* | 9/2021 | Ito | G09G 5/397 |

FOREIGN PATENT DOCUMENTS

| | | |
|---|---|---|
| JP | 2013-009293 A | 1/2013 |
| JP | 2014200008 A | 10/2014 |

OTHER PUBLICATIONS

International Search Report and Written Opinion dated Dec. 26, 2017, from International Patent Application No. PCT/JP2017/038140, 7 sheets.

* cited by examiner

| X COORDINATE VALUE | 4 | 5 | 6 | 7 | 8 |

| Y | | | | | |
|---|---|---|---|---|---|
| 4 | B | Gb | B | Gb | B |
| 5 | Gr | R | Gr | R | Gr |
| 6 | B | Gb | B | Gb | B |
| 7 | Gr | R | Gr | R | Gr |
| 8 | B | Gb | B | Gb | B |

Y COORDINATE VALUE

46a(B)

IMAGE PROCESSING APPARATUS, IMAGE PROCESSING METHOD, AND PROGRAM

TECHNICAL FIELD

The present invention relates to an image processing apparatus, an image processing method, and a program.

BACKGROUND ART

There is a camera including imaging elements provided with different color filters for respective pixels, in which each imaging element acquires a signal of one of a plurality of colors, such as RGB, from each pixel. The camera generates an image of a Bayer array based on the signals. The image of the Bayer array includes four types of pixels including, for example, an R pixel in red, a Gr pixel and a Gb pixel in green, and a B pixel in blue.

A process called a demosaicing process is used to convert the image of the Bayer array generated in this way into a color image in which pixel values of a plurality of colors, such as RGB, are set for respective pixels. Execution of the demosaicing process using well-known classification adaptive processing is described in PTL 1.

Here, the classification adaptive processing is a process of classifying a target pixel, which is a pixel of interest of the image after processing, into a predetermined class and predicting pixel values of the target pixel by using a linear combination of coefficients obtained by learning corresponding to the class and pixel values of the image before processing corresponding to the target pixel.

In addition, there is a technology in which, for example, a multi-core processor or a GPU (Graphics Processing Unit) executes an SIMD (Single Instruction Multiple Data) type operation, which is a parallel technology of a computer for applying one instruction to a plurality of pieces data, to enable highly efficient information processing.

CITATION LIST

Patent Literature

[PTL 1]
Japanese Patent Laid-Open No. 2013-9293

SUMMARY

Technical Problems

In the demosaicing process, for each of surrounding pixels that are included in the image of the Bayer array and that include pixels adjacent to the pixel to be converted into the color image, a process of determining pixel values of pixels of colors different from the color of the pixel is executed. For example, in an example of FIG. 9A, for each of a plurality of pixels centered at a target basic R pixel 46a (R) that is a target R pixel, pixel values of pixels of colors different from the color of the pixel are determined. Furthermore, in an example of FIG. 9B, for each of a plurality of pixels centered at a target basic Gr pixel 46a (Gr) that is a target Gr pixel, pixel values of pixels of colors different from the color of the pixel are determined. Furthermore, in an example of FIG. 9C, for each of a plurality of pixels centered at a target basic Gb pixel 46a (Gb) that is a target Gb pixel, pixel values of pixels of colors different from the color of the pixel are determined. Furthermore, in an example of FIG. 9D, for each of a plurality of pixels centered at a target basic B pixel 46a (B) that is a target B pixel, pixel values of pixels of colors different from the color of the pixel are determined.

Here, as illustrated in FIGS. 9A to 9D, the pattern of the types of surrounding pixels on the basis of the pixel varies depending on the types of pixels included in the image of the Bayer array. Therefore, in the execution of the process, different algorithms need to be executed according to the types of pixels included in the image of the Bayer array. Furthermore, as a result of this, the pixel values of a specific color of a specific pixel included in the image of the Bayer array are determined many times, and the process is wasteful.

Furthermore, in the execution of the above-described process, different algorithms need to be executed according to the colors of the pixels included in the image of the Bayer array, and it is difficult to use the SIMD to make the process efficient.

Note that this is not limited to the situation of generating the color image from the image of the Bayer array. For example, this is generally applied to a situation of generating a color image based on an image including a plurality of pixel sets each including a plurality of single-color pixels arranged in a predetermined color pattern, in which the pixel sets are vertically and horizontally arranged side by side.

The present invention has been made in view of the circumstances, and an object of the present invention is to provide an image processing apparatus, an image processing method, and a program that can highly efficiently execute a generation process of a color image based on an image including a plurality of pixel sets each including a plurality of single-color pixels arranged in a predetermined color pattern, in which the pixel sets are vertically and horizontally arranged side by side.

Solution to Problems

To solve the problem, the present invention provides an image processing apparatus that generates a final image based on a basic image including a plurality of pixel sets each including a plurality of single-color basic pixels arranged in a predetermined color pattern, the pixel sets being vertically and horizontally arranged side by side, the final image including a plurality of multi-color final pixels each associated with at least one of the basic pixels, the final image being a color image, the image processing apparatus including: an intermediate image generation unit that generates, based on the basic image, an intermediate image in which pixel values of a plurality of the basic pixels included in the pixel set are set as values of intermediate pixel data of one intermediate pixel associated with the pixel set; a pixel value determination unit that determines pixel values of a plurality of colors of at least one of the final pixels associated with a target intermediate pixel that is one of the intermediate pixels included in the intermediate image based on values of the intermediate pixel data of the target intermediate pixel and values of the intermediate pixel data of the intermediate pixel adjacent to the target intermediate pixel; and a final image generation unit that generates the final image based on pixel values of a plurality of colors regarding a plurality of the final pixels.

An aspect of the present invention further includes an interpolation process execution unit that determines pixel values of colors different from a color of the basic pixel regarding the basic pixel included in the pixel set associated with the target intermediate pixel or the intermediate pixel adjacent to the target intermediate pixel, in which the pixel value determination unit determines the pixel values of the plurality of colors of at least one of the final pixels associated with the target intermediate pixel based on coefficients corresponding to the pixel values determined by the interpolation process execution unit, the values of the intermediate pixel data of the target intermediate pixel, and the values of the intermediate pixel data of the intermediate pixel adjacent to the target intermediate pixel.

In the aspect, the interpolation process execution unit may determine, for one of the basic pixels, the pixel values of the colors different from the color of the basic pixel just once.

Furthermore, in an aspect of the present invention, the basic image is an image of a Bayer array.

Furthermore, in an aspect of the present invention, the pixel set includes an R pixel, G pixels, and a B pixel arranged in a predetermined color pattern.

Furthermore, an aspect of the present invention further includes a sorting unit that sorts a first value, a second value, a third value, and a fourth value into a first final value, a second final value, a third final value, and a fourth final value in descending order, in which the sorting unit sets the larger one of the first value and the fourth value as a first intermediate value, sets the larger one of the second value and the third value as a second intermediate value, sets the smaller one of the second value and the third value as a third intermediate value, sets the smaller one of the first value and the fourth value as a fourth intermediate value, sets the larger one of the first intermediate value and the second intermediate value as the first final value, sets the smaller one of the first intermediate value and the second intermediate value as the second final value, sets the larger one of the third intermediate value and the fourth intermediate value as the third final value, and sets the smaller one of the third intermediate value and the fourth intermediate value as the fourth final value.

Furthermore, the present invention provides an image processing method of generating a final image based on a basic image including a plurality of pixel sets each including a plurality of single-color basic pixels arranged in a predetermined color pattern, the pixel sets being vertically and horizontally arranged side by side, the final image including a plurality of multi-color final pixels each associated with at least one of the basic pixels, the final image being a color image, the image processing method including: a step of generating, based on the basic image, an intermediate image in which pixel values of a plurality of the basic pixels included in the pixel set are set as values of intermediate pixel data of one intermediate pixel associated with the pixel set; a step of determining pixel values of a plurality of colors of at least one of the final pixels associated with a target intermediate pixel that is one of the intermediate pixels included in the intermediate image based on values of the intermediate pixel data of the target intermediate pixel and values of the intermediate pixel data of the intermediate pixel adjacent to the target intermediate pixel; and a step of generating the final image based on pixel values of a plurality of colors regarding a plurality of the final pixels.

Furthermore, the present invention provides a program causing for a computer, which generates a final image based on a basic image including a plurality of pixel sets each including a plurality of single-color basic pixels arranged in a predetermined color pattern, the pixel sets being vertically and horizontally arranged side by side, the final image including a plurality of multi-color final pixels each associated with at least one of the basic pixels, the final image being a color image, to execute: a procedure of generating, based on the basic image, an intermediate image in which pixel values of a plurality of the basic pixels included in the pixel set are set as values of intermediate pixel data of one intermediate pixel associated with the pixel set; a procedure of determining pixel values of a plurality of colors of at least one of the final pixels associated with a target intermediate pixel that is one of the intermediate pixels included in the intermediate image based on values of the intermediate pixel data of the target intermediate pixel and values of the intermediate pixel data of the intermediate pixel adjacent to the target intermediate pixel; and a procedure of generating the final image based on pixel values of a plurality of colors regarding a plurality of the final pixels.

BRIEF DESCRIPTION OF DRAWINGS

FIG. 5 is a diagram illustrating an example of address spaces allocated to basic pixels in the basic image.

FIG. 9D is a diagram illustrating an example of a pixel group centered at a target basic B pixel.

DESCRIPTION OF EMBODIMENT

Hereinafter, an embodiment of the present invention will be described in detail based on the drawings.

Figure 1:
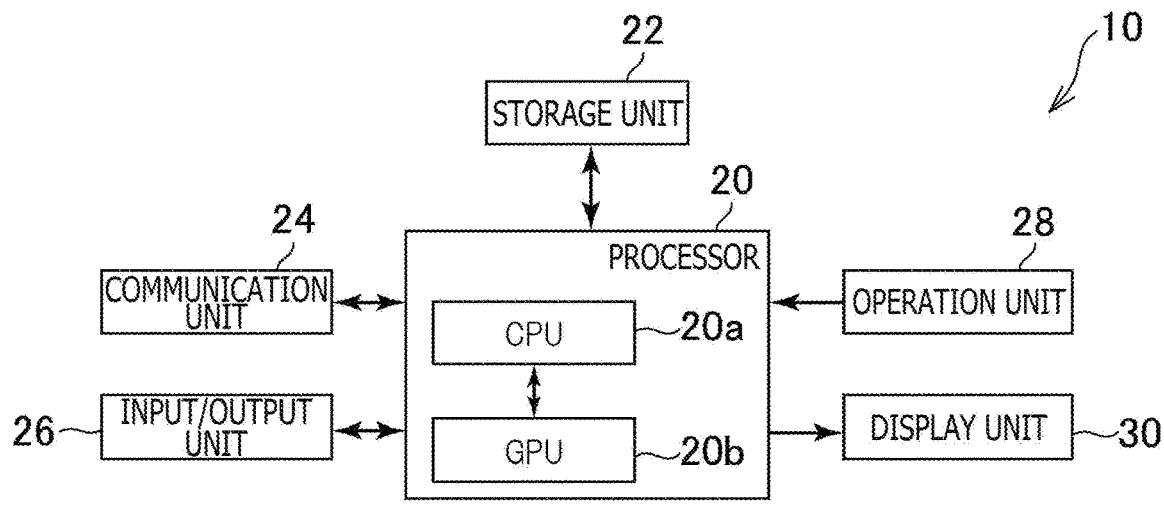
FIG. 1 is a diagram illustrating an example of a configuration of an image processing apparatus according to an embodiment of the present invention.

FIG. 1 is a diagram illustrating an example of a configuration of an image processing apparatus 10 according to an embodiment of the present embodiment. The image processing apparatus 10 according to the present embodiment is, for example, a computer, such as a game console and a personal computer, and as illustrated in FIG. 1, the image processing apparatus 10 includes a processor 20, a storage unit 22, a communication unit 24, an input/output unit 26, an operation unit 28, and a display unit 30.

The processor 20 is, for example, a program control device that operates according to a program installed on the image processing apparatus 10. As illustrated in FIG. 1, the processor 20 according to the present embodiment includes a CPU (Central Processing Unit) 20a and a GPU 20b that draws an image in a frame buffer based on a graphics command or data supplied from the CPU 20a.

In addition, the GPU 20b according to the present embodiment can not only draw an image, but can also execute general information processing. The GPU 20b is suitable for parallel processing, because the number of processing units (threads) that can be executed at the same time is larger than that of the CPU 20a.

Furthermore, it is requested that the processing units (threads) executed at the same time be the same process. A group of bundled processing units (threads) executed at the same time is called, for example, wavefront or warp.

The storage unit 22 is, for example, a storage element, such as a ROM (Read Only Memory) and a RAM (Random Access Memory), a hard disk drive, or the like. A program and the like executed by the processor 20 are stored in the storage unit 22. In addition, the storage unit 22 according to the present embodiment reserves a region of the frame buffer in which the GPU 20b draws an image. In addition, the storage unit 22 according to the present embodiment includes a shared memory with a high access speed that can be shared by all threads belonging to the wavefront or the warp. The shared memory is called, for example, LDS (Local Data Share).

The communication unit 24 is, for example, a communication interface or the like, such as an Ethernet (registered trademark) module and a wireless LAN (Local Area Network) module.

The input/output unit 26 is an input/output port, such as an HDMI (registered trademark) (High-Definition Multimedia Interface) port and a USB (Universal Serial Bus) port.

The operation unit 28 is a keyboard, a mouse, a controller of a game console, or the like. The operation unit 28 receives an operation input of a user and outputs a signal indicating the details of the operation input to the processor 20.

The display unit 30 is a display device, such as a liquid crystal display and an organic EL (Electro Luminescence) display, and the display unit 30 displays various images according to instructions of the processor 20.

Note that the image processing apparatus 10 may further include an optical disk drive or the like that reads an optical disk, such as a DVD (Digital Versatile Disc)-ROM and a Blu-ray (registered trademark) disc.

Figure 2:
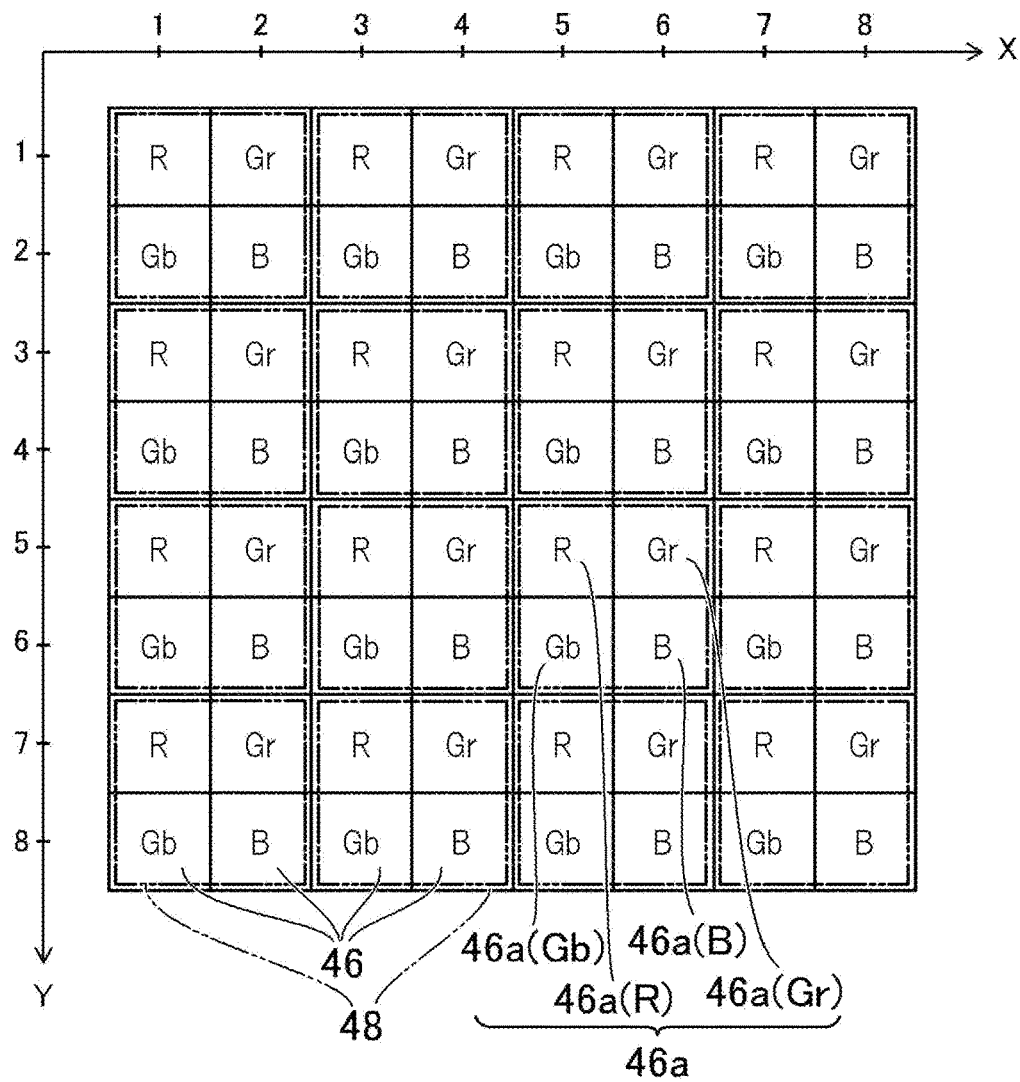
FIG. 2 is a diagram illustrating an example of a basic image.
Figure 3:
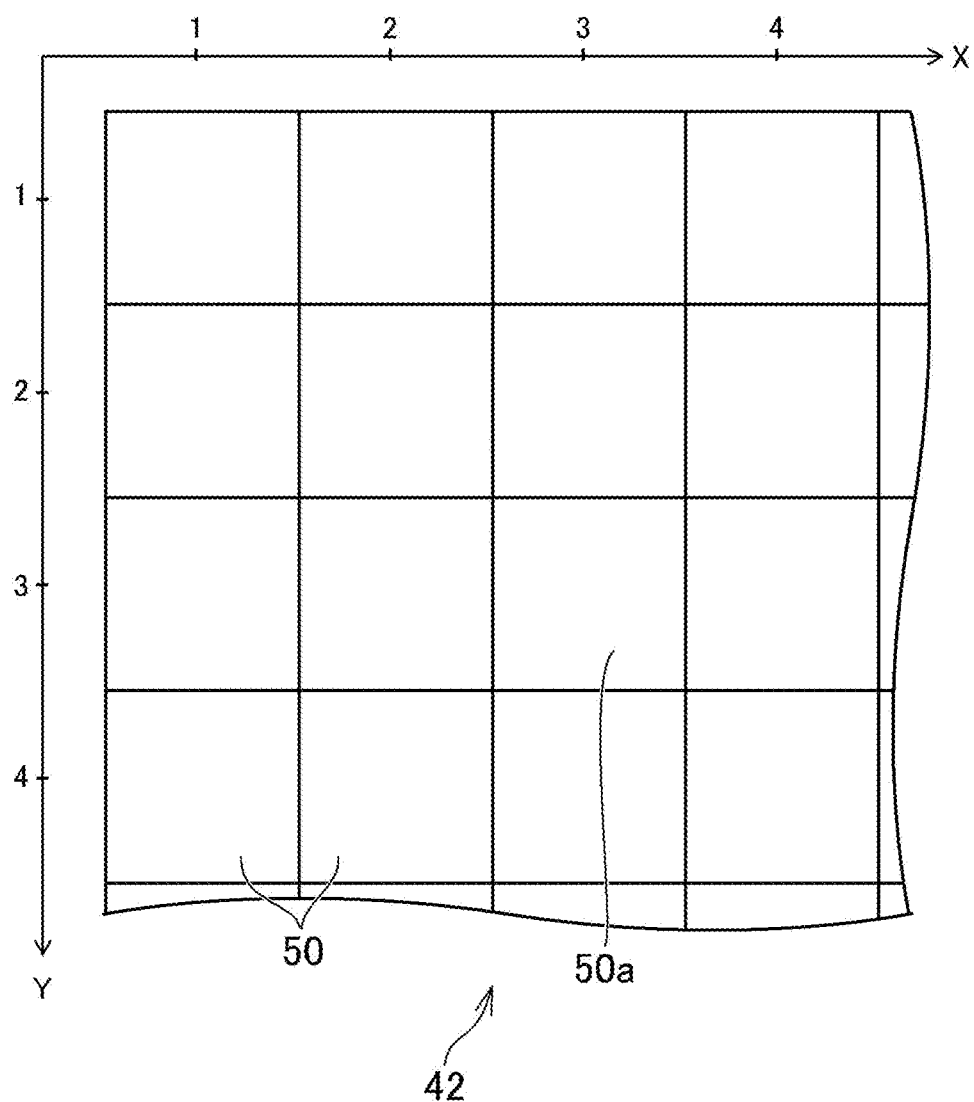
FIG. 3 is a diagram illustrating an example of an intermediate image.
Figure 4:
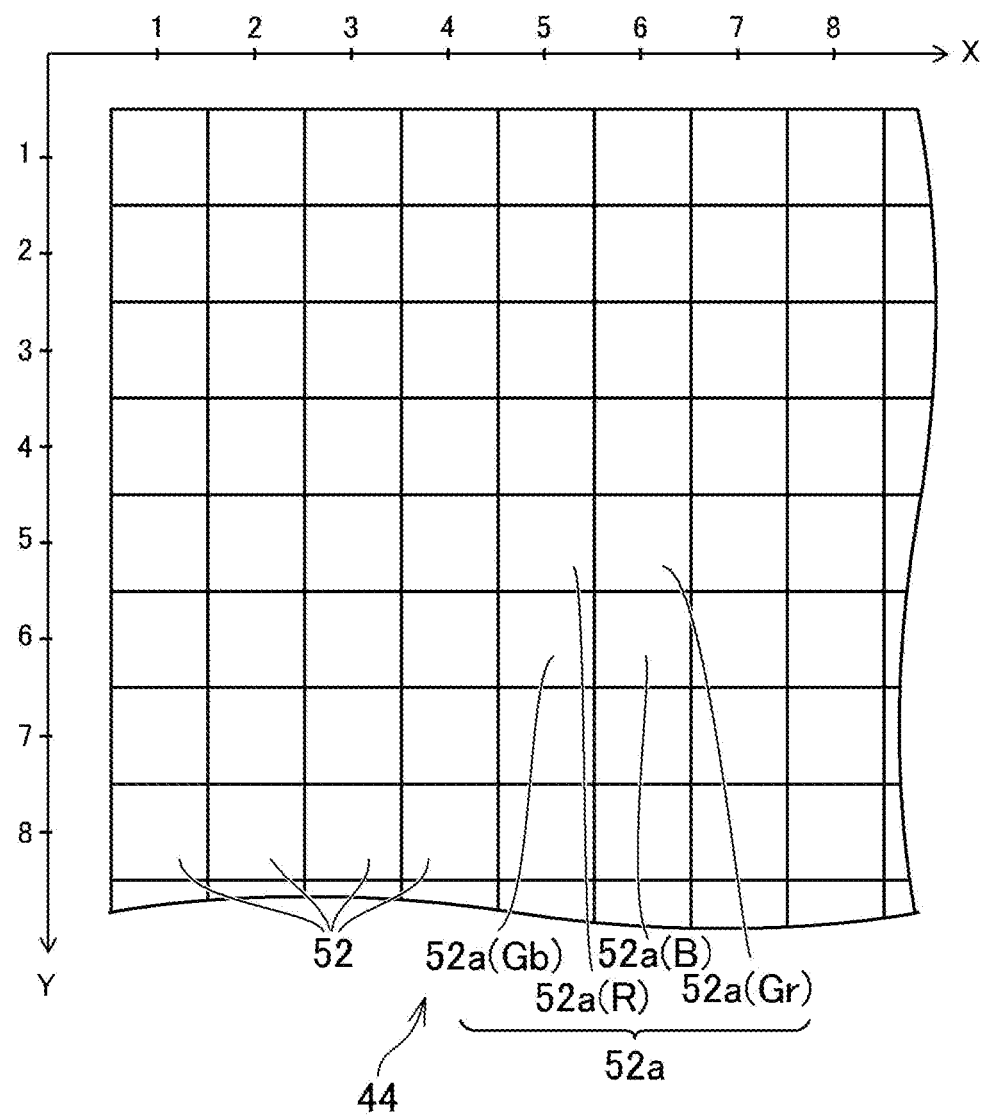
FIG. 4 is a diagram illustrating an example of a final image.

In the image processing apparatus 10 according to the present embodiment, an intermediate image 42 illustrated in FIG. 3 is generated based on a basic image 40 illustrated in FIG. 2. In addition, a final image 44 illustrated in FIG. 4 is generated based on the intermediate image 42 illustrated in FIG. 3. Note that in FIGS. 2 to 4, it is assumed that the direction to the right is an X-axis positive direction, and the direction downward is a Y-axis positive direction.

The basic image 40 is, for example, an image, such as an image of a Bayer array, including a plurality of pixel sets 48 each including a plurality of single-color basic pixels 46 arranged in a predetermined color pattern, in which the pixel sets 48 are vertically and horizontally arranged side by side. It is assumed here that the basic pixels 46 denote pixels included in the basic image 40. The basic image 40 may be, for example, generated by a camera including imaging elements provided with different color filters for the respective basic pixels 46, in which each imaging element acquires a signal of one of a plurality of colors, such as RGB, from each basic pixel 46.

In FIG. 2, the single-color basic pixels 46 are indicated by rectangles with solid lines. Furthermore, the basic pixel 46 indicated by a character R in FIG. 2 is an R pixel in red. Furthermore, the basic pixels 46 indicated by characters Gb and Gr are G pixels in green. Here, the basic pixel 46 indicated by the character Gr is a Gr pixel, and the basic pixel 46 indicated by the character Gb is a Gb pixel. Furthermore, the basic pixel 46 indicated by a character B is a B pixel in blue. In this way, it can be stated that the pixel set 48 included in the basic image 40 illustrated in FIG. 2 includes the R pixel, the G pixels, and the B pixel arranged in a predetermined color pattern.

Furthermore, in the example of FIG. 2, the pixel set 48 including the R pixel arranged on the upper left, the Gr pixel arranged on the upper right, the Gb pixel arranged on the lower left, and the B pixel arranged on the lower right is indicated by a two-dot chain line. Furthermore, the pixel sets 48 are vertically and horizontally arranged side by side in the example of FIG. 2.

Furthermore, in the present embodiment, the intermediate image 42 illustrated in FIG. 3 is generated based on the basic image 40 illustrated in FIG. 2 as described above. Intermediate pixels 50 included in the intermediate image 42 illustrated in FIG. 3 are associated with the pixel sets 48 included in the basic image 40 illustrated in FIG. 2. Here, it is assumed that the intermediate pixels 50 denote pixels included in the intermediate image 42. Furthermore, in the intermediate pixel 50, a vector including elements of pixel values of the four basic pixels 46 included in the pixel set 48 associated with the intermediate pixel 50 is set as values of intermediate pixel data. For example, in a case where the pixel values of the basic pixels 46 are expressed in 32 bits, the values of the intermediate pixel data of the intermediate pixels 50 are expressed in 128 bits.

Here, the values of the intermediate pixel data of the intermediate pixel 50 corresponding to the pixel values of the four basic pixels 46 may be implemented as values of vector variables of four elements. In addition, access to the pixel values of the basic pixels 46 may be implemented as, for example, access to the elements of the vector variables. Furthermore, parallel access to the elements of the vector variables using an SIMD instruction of the GPU 20b may also be implemented. In addition, the values of the intermediate pixel data of the intermediate pixel 50 may be stored in a shared memory that can be shared by all of the threads belonging to the wavefront or the warp. Furthermore, in a case where the CPU 20a is a multi-core processor, parallel access to the elements of the vector variables using an SIMD instruction of the CPU 20a may be implemented.

In the present embodiment, for example, the pixel values of four basic pixels 46 belonging to the pixel set 48 including the lower right basic pixel 46 with coordinate values (p, q) (p and q are even numbers) are set as the values of the intermediate pixel data of the intermediate pixel 50 with coordinate values (p/2, q/2) included in the intermediate image 42. That is, the pixel values of the basic pixels 46 with coordinate values (p−1, q−1), (p, q−1), (p−1, q), and (p, q) are set as the values of the intermediate pixel data of the intermediate pixel 50 with coordinate values (p/2, q/2) included in the intermediate image 42. For example, the pixel values of the basic pixels 46 with coordinate values (5, 5), (6, 5), (5, 6), and (6, 6) included in the basic image 40 are set as the values of the intermediate pixel data of the intermediate pixel 50 with coordinate values (3, 3) included in the intermediate image 42.

Note that in the present embodiment, it is assumed that the number of pixels of the basic image 40 is n (n is an even number) vertically and horizontally. Therefore, the number of pixels of the intermediate image 42 is (n/2) vertically and horizontally.

Figure 5:
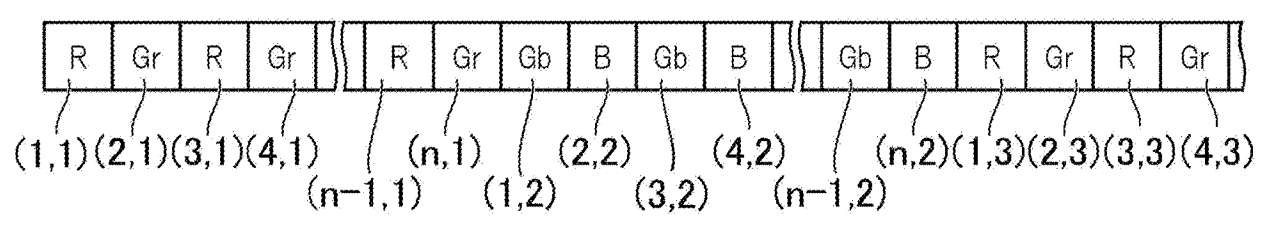
Figure 6:
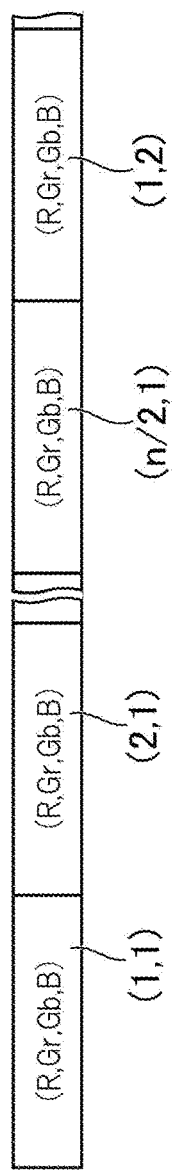
FIG. 6 is a diagram illustrating an example of address spaces allocated to intermediate pixels in the intermediate image.

FIG. 5 is a diagram illustrating an example of address spaces allocated to the basic pixels 46 in the basic image 40 illustrated in FIG. 2. FIG. 6 is a diagram illustrating an example of address spaces allocated to the intermediate pixels 50 in the intermediate image 42 illustrated in FIG. 3.

As illustrated in FIG. 5, in the basic image 40, address spaces are serially allocated to the basic pixels 46 of the first row in which the Y coordinate value is 1. Furthermore, continuously to the address spaces allocated to the basic pixels 46 of the first row, address spaces are allocated to the basic pixels 46 of the second row in which the Y coordinate value is 2. Subsequently, continuously to the address spaces allocated to the basic pixels 46 of the second row, address spaces are allocated to the basic pixels 46 of the third row in which the Y coordinate value is 3, to the basic pixels 46 of the fourth row in which the Y coordinate value is 4, . . . .

Therefore, in the basic image 40 illustrated in FIG. 5, the regions provided with the pixel values of the R pixel and the Gr pixel included in the pixel set 48 and the regions provided with the pixel values of the Gb pixel and the B pixel included in the pixel set 48 are separated. For example, the regions provided with the pixel values of the basic pixels 46 with coordinate values (p−1, q−1) and (p, q−1) and the regions provided with the pixel values of the basic pixels 46 with coordinate values (p−1, q) and (p, q) are separated. In the example of FIG. 5, the regions provided with the pixel values of the basic pixels 46 with coordinate values (1, 1) and (2, 1) and the regions provided with the pixel values of the basic pixels 46 with coordinate values (1, 2) and (2, 2) are separated.

Furthermore, as illustrated in FIG. 6, in the intermediate image 42, address spaces are serially allocated to the intermediate pixels 50 of the first row in which the Y coordinate value is 1. Furthermore, continuously to the address spaces allocated to the intermediate pixels 50 of the first row, address spaces are allocated to the intermediate pixels 50 of the second row in which the Y coordinate value is 2. Subsequently, continuously to the address spaces allocated to the intermediate pixels 50 of the second row, address spaces are allocated to the intermediate pixels 50 of the third row in which the Y coordinate value is 3, to the intermediate pixels 50 of the fourth row in which the Y coordinate value is 4, . . . .

Here, one intermediate pixel 50 in the intermediate image 42 corresponds to four basic pixels 46 belonging to one pixel set 48 in the basic image 40. Therefore, the pixel values of four basic pixels 46 belonging to one pixel set 48 in the basic image 40 are arranged in the region provided with the values of the intermediate pixel data of one intermediate pixel 50 in the intermediate image 42. For example, the pixel values of the basic pixels 46 with coordinate values (p−1, q−1), (p, q−1), (p−1, q), and (p, q) are arranged in the region provided with the values of the intermediate pixel data of the intermediate pixel 50 with coordinate values (p/2, q/2). Therefore, in the arrangement of the address spaces illustrated in FIG. 6, the region provided with the pixel values of the R pixel and the Gr pixel included in one pixel set 48 and the region provided with the pixel values of the Gb pixel and the B pixel included in the pixel set 48 are continuous.

Thus, the access speed of the memory in acquiring the pixel values of all basic pixels 46 belonging to one pixel set 48 is faster in the allocation of the address spaces illustrated in FIG. 6 than in the allocation of the address spaces illustrated in FIG. 5. In addition, the acquisition of the pixel values of the basic pixels 46 belonging to the pixel set 48 adjacent to a pixel set 48 is also faster in the allocation of the address spaces illustrated in FIG. 6 than in the allocation of the address spaces illustrated in FIG. 5.

Furthermore, in the present embodiment, the final image 44 illustrated in FIG. 4 is generated based on the intermediate image 42 illustrated in FIG. 3 as described above. The final image 44 in the present embodiment is, for example, a color image in the same size (the number of pixels) as the basic image 40, and pixel values of a plurality of colors (for example, RGB pixel values here) are set as the pixel values of final pixels 52 of the final image 44. It is assumed here that the final pixels 52 denote pixels included in the final image 44. In addition, the generation process of the final image 44 based on the basic image 40 in the present embodiment is a process corresponding to a demosaicing process. Note that the size (the number of pixels) of the final image 44 may not be the same as that of the basic image 40. The size of the final image 44 may be larger than the size of the basic image 40. In addition, the size of the final image 44 may be smaller than the size of the basic image 40.

Hereinafter, a determination process of the RGB pixel values of four target final pixels 52*a* illustrated in FIG. 4 will be used as a subject matter to describe an example of a determination process of the RGB pixel values of the final pixels 52 with reference to FIG. 7. Here, the respective coordinate values of the four target final pixels 52*a* are (5, 5), (6, 5), (5, 6), and (6, 6).

Here, as illustrated in FIG. 3, the intermediate pixel 50 of the intermediate image 42 corresponding to the four target final pixels 52*a* will be referred to as a target intermediate pixel 50*a*. The coordinate values of the target intermediate pixel 50*a* are (3, 3).

In addition, as illustrated in FIG. 2, four basic pixels 46 corresponding to the four target final pixels 52*a* included in the basic image 40 will be referred to as target basic pixels 46*a*. Furthermore, the R pixel, the Gr pixel, the Gb pixel, and the B pixel of the target basic pixels 46*a* will be referred to as a target basic R pixel 46*a* (R), a target basic Gr pixel 46*a* (Gr), a target basic Gb pixel 46*a* (Gb), and a target basic B pixel 46*a* (B), respectively.

In addition, as illustrated in FIG. 4, the target final pixel 52*a* corresponding to the target basic R pixel 46*a* (R) will be referred to as a target final R pixel 52*a* (R). In addition, the target final pixel 52*a* corresponding to the target basic Gr pixel 46*a* (Gr) will be referred to as a target final Gr pixel 52*a* (Gr). In addition, the target final pixel 52*a* corresponding to the target basic Gb pixel 46*a* (Gb) will be referred to as a target final Gb pixel 52*a* (Gb). In addition, the target final pixel 52*a* corresponding to the target basic B pixel 46*a* (B) will be referred to as a target final B pixel 52*a* (B).

Figure 7:
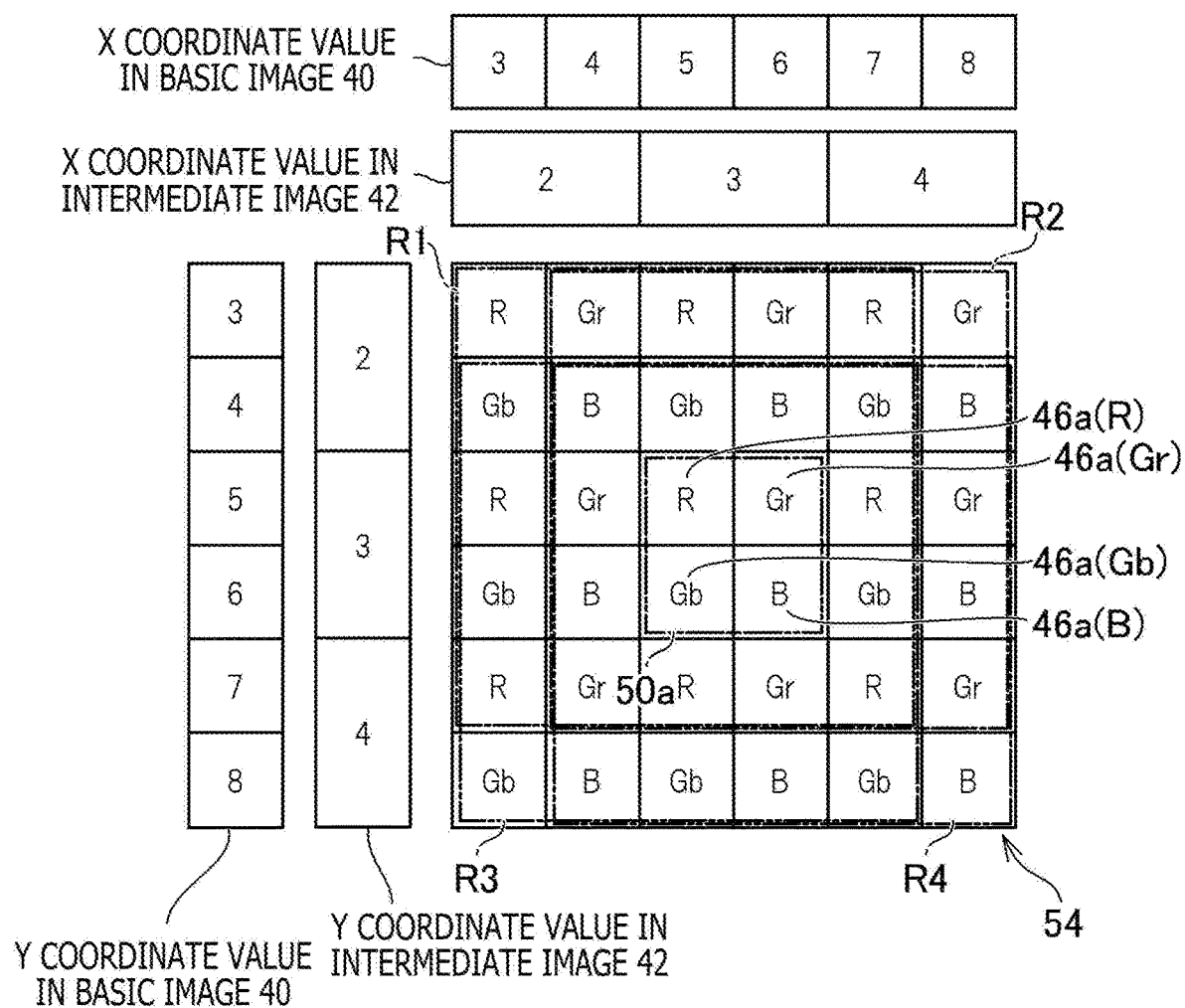
FIG. 7 is an explanatory view describing an example of a determination process of RGB pixel values of final pixels.

As illustrated in FIG. 7, to determine the RGB pixel values of the four target final pixels 52*a* corresponding to the target intermediate pixel 50*a*, the values of the intermediate pixel data of nine intermediate pixels 50 centered at the target intermediate pixel 50*a* are referenced. The nine intermediate pixels 50 correspond to 36 basic pixels 46 included in the basic image 40. Hereinafter, the pixel group of the 36 basic pixels 46 will be referred to as a reference pixel group 54.

As illustrated in FIG. 7, the basic pixels 46 with X coordinate values 3 to 8 and Y coordinate values 3 to 8 belong to the reference pixel group 54.

In addition, for the single-color basic pixel 46 belonging to the reference pixel group 54, an interpolation process of determining the pixel values of the colors different from the color of the basic pixel 46 is executed. In the interpolation process executed here, interpolation using a sine function, interpolation using a triangle wave filter, or the like can be used, for example.

For example, the G pixel value and the B pixel value are determined for the R pixel belonging to the reference pixel group 54. In addition, for example, the R pixel value and the B pixel value are determined for the Gr pixel and the Gb pixel belonging to the reference pixel group 54. In addition, for example, the R pixel value and the G pixel value are determined for the B pixel belonging to the reference pixel group 54.

Furthermore, in the present embodiment, a GInter value is determined for the basic pixel 46 belonging to the reference pixel group 54, for example. The GInter value is a value used to determine the G pixel value and is similar to a luminance value. Here, the GInter value of the basic pixel 46 is determined based on, for example, the R pixel value, the G pixel value, and the B pixel value of the basic pixel 46.

Furthermore, in the present embodiment, well-known classification adaptive processing is used to determine a class of the target basic pixel 46a for each of the four target basic pixels 46a based on the R pixel value, the G pixel value, the B pixel value, and the GInter value determined in this way. As described above, the class is associated with a coefficient obtained by learning.

Furthermore, in the present embodiment, the RGB pixel values of the target final R pixel 52a (R) are determined based on, for example, the pixel values of 25 basic pixels 46 centered at the target basic R pixel 46a (R) and the coefficient associated with the class of the target basic R pixel 46a (R). Here, the region including the 25 basic pixels 46 centered at the target basic R pixel 46a (R) is indicated as a region R1 in FIG. 7. The region R1 is a region including the basic pixels 46 with X coordinate values 3 to 7 and Y coordinate values 3 to 7 in the basic image 40.

Here, the R pixel value of the target final R pixel 52a (R) may be determined based on the R pixel values of the R pixels in the region R1 and the coefficient associated with the class of the target basic R pixel 46a (R). In addition, the G pixel value of the target final R pixel 52a (R) may be determined based on the G pixel values of the Gr pixels and the Gb pixels in the region R1 and the coefficient associated with the class of the target basic R pixel 46a (R). In addition, the B pixel value of the target final R pixel 52a (R) may be determined based on the B pixel values of the B pixels in the region R1 and the coefficient associated with the class of the target basic R pixel 46a (R).

Furthermore, in the present embodiment, the RGB pixel values of the target final Gr pixel 52a (Gr) are determined based on, for example, the pixel values of 25 basic pixels 46 centered at the target basic Gr pixel 46a (Gr) and the coefficient associated with the class of the target basic Gr pixel 46a (Gr). Here, the region including the 25 basic pixels 46 centered at the target basic Gr pixel 46a (Gr) is indicated as a region R2 in FIG. 7. The region R2 is a region including the basic pixels 46 with X coordinate values 4 to 8 and Y coordinate values 3 to 7 in the basic image 40.

Here, the R pixel value of the target final Gr pixel 52a (Gr) may be determined based on the R pixel values of the R pixels in the region R2 and the coefficient associated with the class of the target basic Gr pixel 46a (Gr). In addition, the G pixel value of the target final Gr pixel 52a (Gr) may be determined based on the G pixel values of the Gr pixels and the Gb pixels in the region R2 and the coefficient associated with the class of the target basic Gr pixel 46a (Gr). In addition, the B pixel value of the target final Gr pixel 52a (Gr) may be determined based on the B pixel values of the B pixels in the region R2 and the coefficient associated with the class of the target basic Gr pixel 46a (Gr).

Furthermore, in the present embodiment, the RGB pixel values of the target final Gb pixel 52a (Gb) are determined based on, for example, the pixel values of 25 basic pixels 46 centered at the target basic Gb pixel 46a (Gb) and the coefficient associated with the class of the target basic Gb pixel 46a (Gb). Here, the region including the 25 basic pixels 46 centered at the target basic Gb pixel 46a (Gb) is indicated as a region R3 in FIG. 7. The region R3 is a region including the basic pixels 46 with X coordinate values 3 to 7 and Y coordinate values 4 to 8 in the basic image 40.

Here, the R pixel value of the target final Gb pixel 52a (Gb) may be determined based on the R pixel values of the R pixels in the region R3 and the coefficient associated with the class of the target basic Gb pixel 46a (Gb). In addition, the G pixel value of the target final Gb pixel 52a (Gb) may be determined based on the G pixel values of the Gr pixels and the Gb pixels in the region R3 and the coefficient associated with the class of the target basic Gb pixel 46a (Gb). In addition, the B pixel value of the target final Gb pixel 52a (Gb) may be determined based on the B pixel values of the B pixels in the region R3 and the coefficient associated with the class of the target basic Gb pixel 46a (Gb).

Furthermore, in the present embodiment, the RGB pixel values of the target final B pixel 52a (B) are determined based on, for example, the pixel values of the 25 basic pixels 46 centered at the target basic B pixel 46a (B) and the coefficient associated with the class of the target basic B pixel 46a (B). Here, the region including 25 basic pixels 46 centered at the target basic B pixel 46a (B) are indicated as a region R4 in FIG. 7. The region R4 is a region including the basic pixels 46 with X coordinate values 4 to 8 and Y coordinate values 4 to 8 in the basic image 40.

Here, the R pixel value of the target final B pixel 52a (B) may be determined based on the R pixel values of the R pixels in the region R4 and the coefficient associated with the class of the target basic B pixel 46a (B). In addition, the G pixel value of the target final B pixel 52a (B) may be determined based on the G pixel values of the Gr pixels and the Gb pixels in the region R4 and the coefficient associated with the class of the target basic B pixel 46a (B). In addition, the B pixel value of the target final B pixel 52a (B) may be determined based on the B pixel values of the B pixels in the region R4 and the coefficient associated with the class of the target basic B pixel 46a (B).

Note that the determination method of the RGB pixel values of the target final pixel 52a is not limited to the method described above.

Figures 8, 9A:
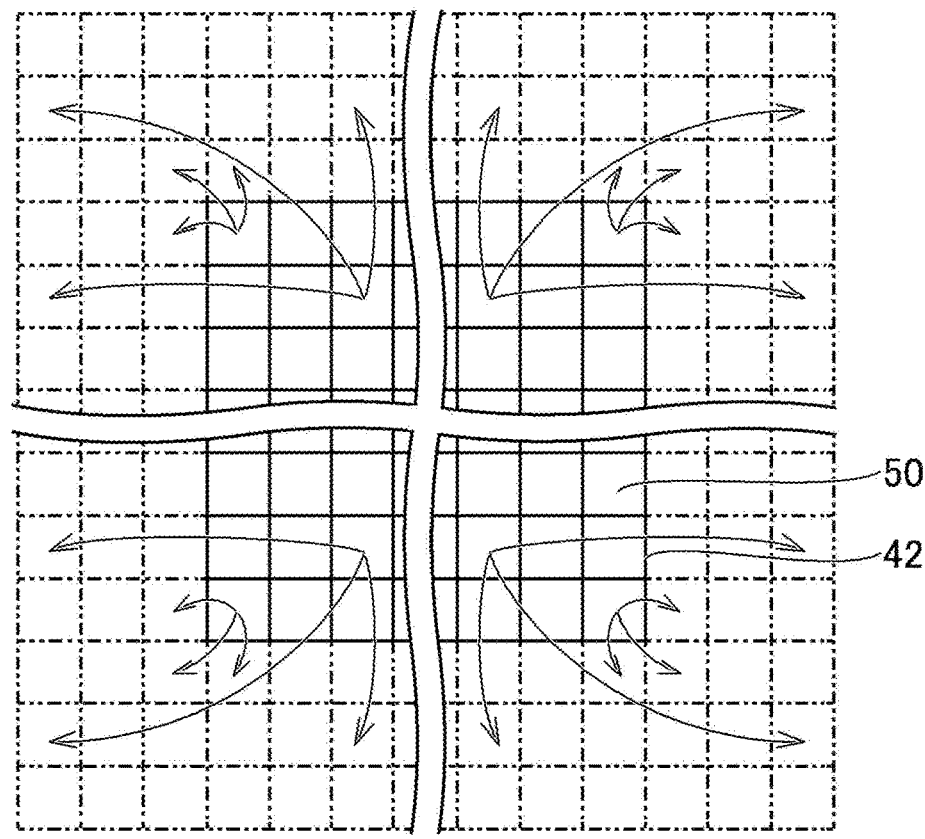
FIG. 8 is a diagram illustrating an example of correspondence between pixel values of intermediate pixels in the intermediate image and pixel values of pixels assumed to exist around the intermediate image.
FIG. 9A is a diagram illustrating an example of a pixel group centered at a target basic R pixel.

Furthermore, in the present embodiment, the interpolation process and the determination process of the pixel values of the final pixels 52 are executed by assuming that pixels also exist around the intermediate image 42 as illustrated in FIG. 8. Here, for example, the values of the intermediate pixel data of the intermediate pixels 50 in the intermediate image 42 may be set as values of the intermediate pixel data of the pixels assumed to exist at positions symmetric about a side or a vertex of the intermediate image 42. FIG. 8 illustrates an example of a correspondence between the values of the intermediate pixel data of the intermediate pixel 50 in the intermediate image 42 and the values of the intermediate pixel data of the pixels assumed to exist around the intermediate image 42. In FIG. 8, the pixels assumed to exist are indicated by two-dot chain lines. Furthermore, in FIG. 8, arrows schematically illustrate that the values of the intermediate pixel data of the intermediate pixel 50 in the intermediate image 42 are set as values of the intermediate pixel data of three pixels assumed to exist around the intermediate image 42.

Figure 9B:
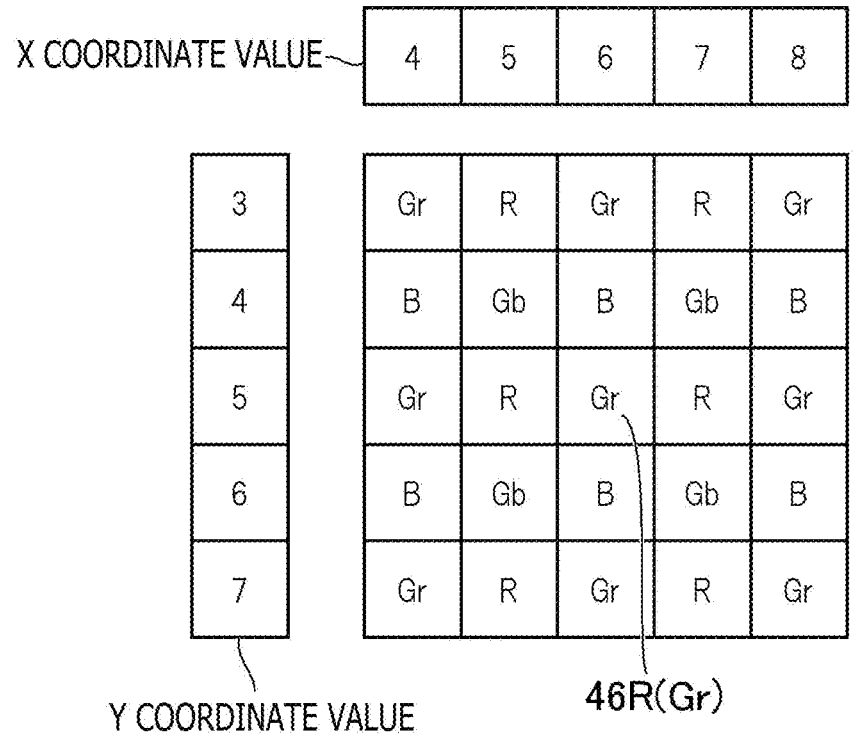
FIG. 9B is a diagram illustrating an example of a pixel group centered at a target basic Gr pixel.
Figure 9C:
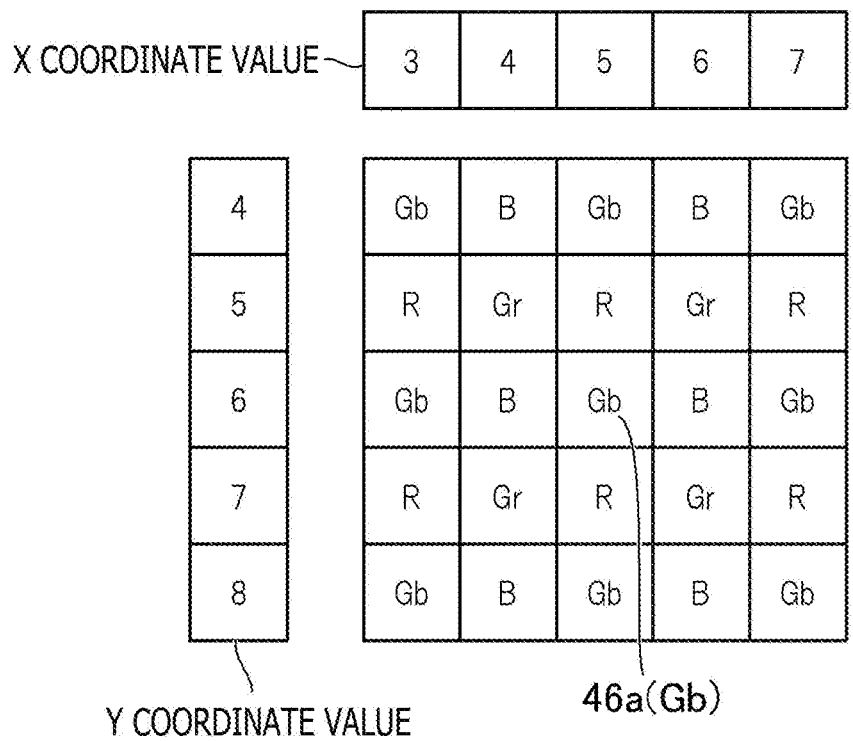
FIG. 9C is a diagram illustrating an example of a pixel group centered at a target basic Gb pixel.

FIG. 9A illustrates a pixel group centered at the target basic R pixel 46a (R) corresponding to the pixel group in the region R1 of FIG. 7. FIG. 9B illustrates a pixel group centered at the target basic Gr pixel 46a (Gr) corresponding to the pixel group in the region R2 of FIG. 7. FIG. 9C illustrates a pixel group centered at the target basic Gb pixel 46a (Gb) corresponding to the pixel group in the region R3 of FIG. 7. FIG. 9D illustrates a pixel group centered at the target basic B pixel 46a (B) corresponding to the pixel group in the region R4 of FIG. 7.

As illustrated in FIGS. 9A to 9D, the pattern of the types of surrounding pixels centered at the basic pixel 46 varies according to the type of basic pixel 46. Therefore, the interpolation process in the conventional demosaicing process needs to be executed by using different algorithms for the pixel group illustrated in FIG. 9A, for the pixel group illustrated in FIG. 9B, for the pixel group illustrated in FIG. 9C, and for the pixel group illustrated in FIG. 9D. For example, in a case where the algorithms are implemented by the GPU 20b, shader programs associated with the types of basic pixels 46 included in the basic image 40 need to be executed.

In addition, for the basic pixels 46 assumed to exist around the basic image 40, the types of the basic pixels 46 need to be taken into account to execute the algorithms.

In this way, various types of branch processing need to be implemented according to the type of the basic pixel 46 and the position of the basic pixel 46 in the conventional demosaicing process. Therefore, the conventional demosaicing process is unsuitable for the execution by the GPU 20b with poor execution efficiency of branch processing.

In the intermediate pixels 50 of the intermediate image 42 according to the present embodiment, the values of the intermediate pixel data corresponding to the pixel values of the R pixel, the Gr pixel, the Gb pixel, and the B pixel are set in each intermediate pixel 50, unlike in the basic pixels 46 of the basic image 40. Furthermore, the same type of values of intermediate pixel data is set in all of the intermediate pixels 50. Therefore, the interpolation process does not have to be executed according to the type of intermediate pixel 50. In addition, the type of intermediate pixels 50 do not have to be taken into account for the intermediate pixels 50 assumed to exist around the intermediate image 42. Therefore, the necessity for implementing the branch processing is low in the present embodiment. Therefore, the demosaicing process according to the present embodiment is suitable for the implementation in the GPU 20b.

Furthermore, in the present embodiment, the values of the intermediate pixel data corresponding to the pixel values of the R pixel, the Gr pixel, the Gb pixel, and the B pixel are set in all of the intermediate pixels 50 included in the intermediate image 42. Therefore, the SIMD can be easily used in the process executed by the image processing apparatus 10 according to the present embodiment.

Furthermore, in the conventional demosaicing process, specific pixel values of specific basic pixels 46 need to be determined for many times. For example, in the examples of FIGS. 9A to 9D, the R pixel value and the G pixel value of the basic pixel 46 that is a B pixel with coordinate values (4, 4) need to be determined four times. Therefore, the process is wasteful.

On the other hand, in the interpolation process of the image processing apparatus 10 according to the present embodiment, the interpolation process is applied only once to the basic pixels 46 belonging to the reference pixel group 54 in calculating the RGB pixel values of the target final pixel 52a in the example of FIG. 7. Therefore, according to the image processing apparatus 10 of the present embodiment, the process is not wasteful, and a highly efficient process can be executed.

Note that the demosaicing process according to the present embodiment may be executed by the CPU 20a or may be executed by the GPU 20b. In addition, the SIMD can be used in the GPU 20b as described above to further increase the efficiency of the demosaicing process according to the present embodiment. In addition, the efficiency of the demosaicing process according to the present embodiment can be further increased by using the SIMD in the CPU 20a in the case where the CPU 20a is a multi-core processor.

Hereinafter, the functions of the image processing apparatus 10 and the processes executed by the image processing apparatus 10 according to the present embodiment will be further described.

Figure 10:
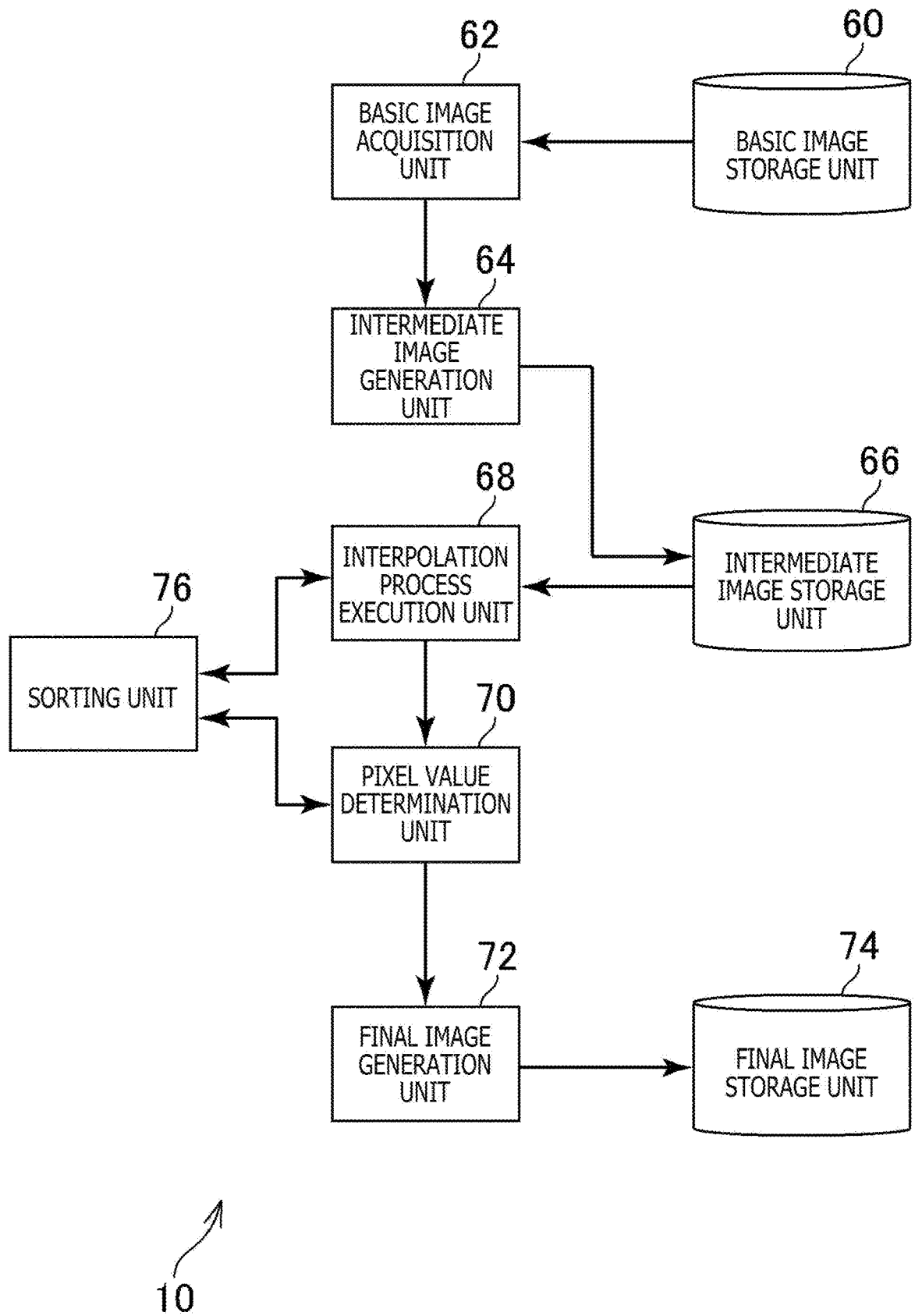
FIG. 10 is a functional block diagram illustrating an example of functions implemented in the image processing apparatus according to the embodiment of the present invention.

FIG. 10 is a functional block diagram illustrating an example of the functions implemented in the image processing apparatus 10 according to the present embodiment. Note that not all of the functions illustrated in FIG. 10 have to be implemented in the image processing apparatus 10 according to the present embodiment, and functions other than the functions illustrated in FIG. 10 may be implemented.

As illustrated in FIG. 10, the image processing apparatus 10 includes functions including, for example, a basic image storage unit 60, a basic image acquisition unit 62, an intermediate image generation unit 64, an intermediate image storage unit 66, an interpolation process execution unit 68, a pixel value determination unit 70, a final image generation unit 72, a final image storage unit 74, and a sorting unit 76. The storage unit 22 is the master unit of the basic image storage unit 60, the intermediate image storage unit 66, and the final image storage unit 74. The processor 20 is the master unit of the basic image acquisition unit 62, the intermediate image generation unit 64, the interpolation process execution unit 68, the pixel value determination unit 70, the final image generation unit 72, and the sorting unit 76.

A program that is installed on the image processing apparatus 10 as a computer and that includes instructions corresponding to the functions may be executed by the processor 20 to implement the functions. The program may be supplied to the image processing apparatus 10 through, for example, a computer-readable information storage medium, such as an optical disk, a magnetic disk, a magnetic tape, a magneto-optical disk, and a flash memory, or through the Internet or the like.

The basic image storage unit 60 in the present embodiment includes, for example, the plurality of pixel sets 48 each including the plurality of single-color basic pixels 46 arranged in a predetermined color pattern and stores the basic image 40 including the pixel sets 48 vertically and horizontally arranged side by side.

The basic image acquisition unit 62 in the present embodiment acquires, for example, the basic image 40 stored in the basic image storage unit 60.

The intermediate image generation unit 64 in the present embodiment generates, based on the basic image 40, the intermediate image 42 in which the pixel values of the plurality of basic pixels 46 included in the pixel set 48 are set as the values of the intermediate pixel data of one intermediate pixel 50 associated with the pixel set 48, for example. Here, the intermediate image generation unit 64 may generate the intermediate image 42 based on the basic image 40 acquired by the basic image acquisition unit 62. In addition, the intermediate image generation unit 64 may cause the intermediate image storage unit 66 to store the generated intermediate image 42.

The intermediate image storage unit 66 in the present embodiment stores, for example, the intermediate image 42 generated by the intermediate image generation unit 64. As described above, the intermediate image storage unit 66 may be implemented by a shared memory that can be shared by all of the threads belonging to the wavefront or the warp.

In relation to a basic pixel 46 included in the pixel set 48 associated with the target intermediate pixel 50a or the intermediate pixel 50 adjacent to the target intermediate pixel 50a, the interpolation process execution unit 68 in the present embodiment determines, for example, the pixel values of the colors different from the color of the basic pixel 46. Here, for example, the interpolation process execution unit 68 may determine, for each basic pixel 46 belonging to the reference pixel group 54, the pixel values of the colors different from the color of the basic pixel 46 based on the pixel values of the basic pixels 46 belonging to the reference pixel group 54.

Here, as described above, the interpolation process execution unit 68 may determine the pixel values of the colors different from the color of the basic pixel 46 just once for one basic pixel 46.

The pixel value determination unit 70 in the present embodiment determines, for example, the pixel values of a plurality of colors of at least one final pixel 52 associated with the target intermediate pixel 50a. Here, the pixel values of a plurality of colors of at least one final pixel 52 associated with the target intermediate pixel 50a may be determined based on, for example, the values of the intermediate pixel data of the target intermediate pixel 50a and the values of the intermediate pixel data of the intermediate pixels 50 adjacent to the target intermediate pixel 50a. In addition, for example, the pixel values of a plurality of colors of at least one final pixel 52 associated with the target intermediate pixel 50a may be determined based on coefficients corresponding to the pixel values determined by the interpolation process execution unit 68 and based on the values of the intermediate pixel data of the target intermediate pixel 50a and the intermediate pixel 50 adjacent to the target intermediate pixel 50a. Note that data indicating the coefficients or data indicating the correspondence between the pixel values determined by the interpolation process execution unit 68 and the coefficients may be held in the pixel value determination unit 70.

The final image generation unit 72 in the present embodiment generates, for example, the final image 44 that is a color image based on the pixel values of a plurality of colors in relation to the plurality of final pixels 52. The final image generation unit 72 may cause the display unit 30 to display the generated final image 44. In addition, the final image generation unit 72 may cause the final image storage unit 74 to store the generated final image 44.

The final image storage unit 74 in the present embodiment stores, for example, the final image 44 generated by the final image generation unit 72. Here, the final image 44 stored in the final image storage unit 74 may be displayed on the display unit 30 according to operation of the operation unit 28 by the user.

The sorting unit 76 in the present embodiment sorts, for example, four values, such as values of elements of vector variables, and specifies the second largest value and the second smallest value. For example, in a case where four values, such as values of elements of vector variables, need to be sorted to specify the second largest value and the second smallest value in the demosaicing process of the present embodiment, the process is executed by the sorting unit 76.

Figure 11:
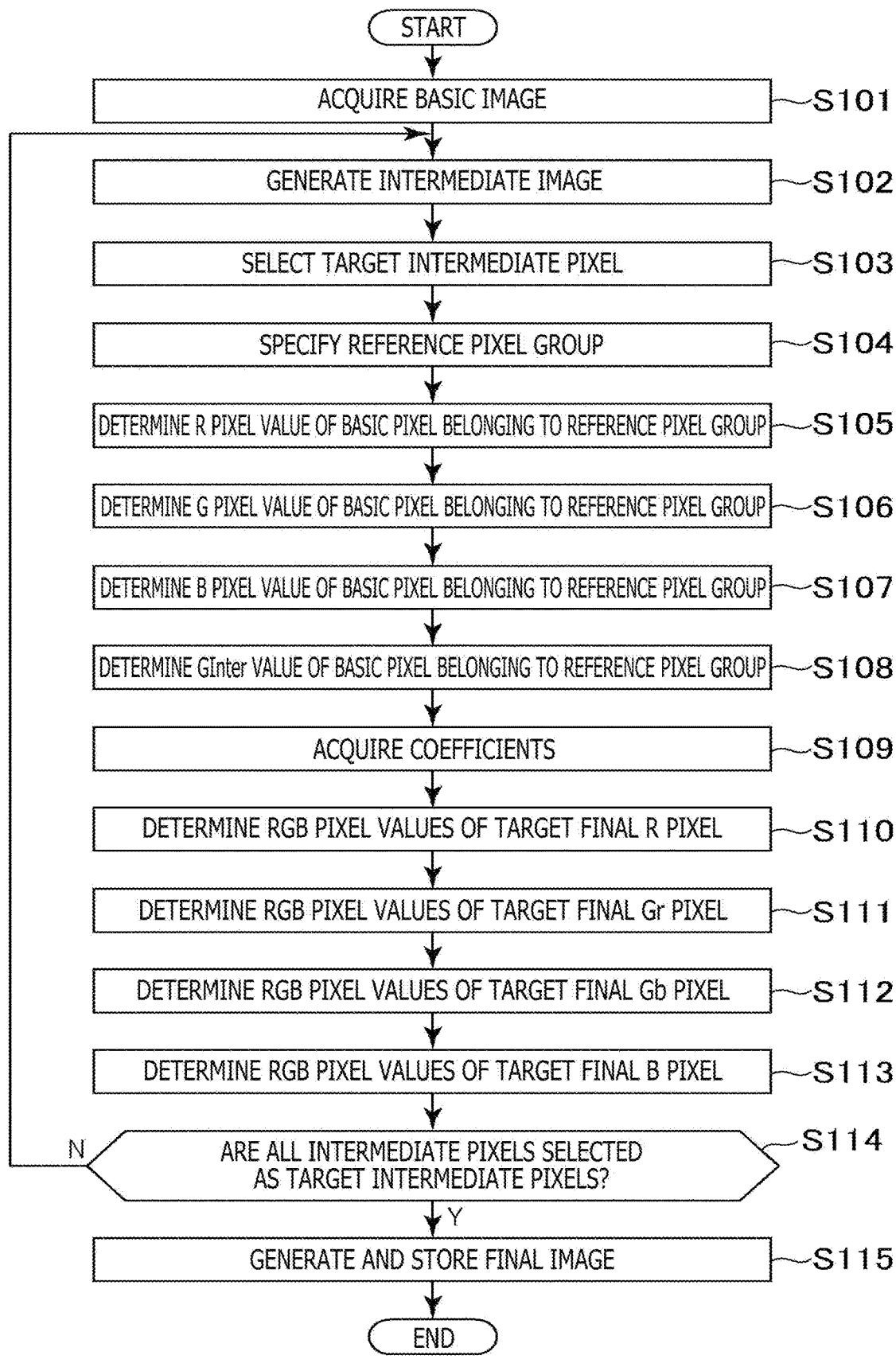
FIG. 11 is a flow chart illustrating an example of a flow of a process executed by the image processing apparatus according to the embodiment of the present invention.

Here, an example of a flow of the generation process of the final image 44 executed by the image processing apparatus 10 according to the present embodiment will be described with reference to a flow chart illustrated in FIG. 11.

First, the basic image acquisition unit 62 acquires the basic image 40 stored in the basic image storage unit 60 (S101).

Furthermore, the intermediate image generation unit 64 generates the intermediate image 42 based on the basic image 40 acquired in the process illustrated in S101 (S102).

Furthermore, the interpolation process execution unit 68 selects, as a target intermediate pixel 50a, an intermediate pixel 50 that is included in the intermediate image 42 generated in the process illustrated in S102 and that is not subjected to the processes illustrated in S104 to S113 (S103).

Furthermore, the interpolation process execution unit 68 specifies the reference pixel group 54 based on the target intermediate pixel 50a selected in the process illustrated in S103 (S104).

Furthermore, for each of the basic pixels 46 belonging to the reference pixel group 54 specified in the process illustrated in S104, the interpolation process execution unit 68 determines the R pixel value of the basic pixel 46 (S105).

Furthermore, for each of the basic pixels 46 belonging to the reference pixel group 54 specified in the process illustrated in S104, the interpolation process execution unit 68 determines the G pixel value of the basic pixel 46 (S106).

Furthermore, for each of the basic pixels 46 belonging to the reference pixel group 54 specified in the process illustrated in S104, the interpolation process execution unit 68 determines the B pixel value of the basic pixel 46 (S107).

Furthermore, for each of the basic pixels 46 belonging to the reference pixel group 54 specified in the process illustrated in S104, the interpolation process execution unit 68 determines the GInter value based on the pixel values determined in the processes illustrated in S105 to S107 (S108).

Furthermore, for each of the target basic pixels 46a associated with the target intermediate pixel 50a selected in the process illustrated in S103, the pixel value determination unit 70 acquires the coefficients associated with the values determined in the processes illustrated in S105 to S108 (S109).

Furthermore, the pixel value determination unit 70 determines the RGB pixel values of the target final R pixel 52a (R) based on the values determined in the processes illustrated in S105 to S108 and the coefficients acquired in the process illustrated in S109 (S110). Here, for example, the RGB pixel values of the target final R pixel 52a (R) may be determined based on the values that are determined in the processes illustrated in S105 to S108 and that are determined for the basic pixels 46 existing in a region in a predetermined size centered at the target final R pixel 52a (R).

Furthermore, the pixel value determination unit 70 determines the RGB pixel values of the target final Gr pixel 52a (Gr) based on the values determined in the processes illustrated in S105 to S108 and the coefficients acquired in the process illustrated in S109 (S111). Here, the RGB pixel values of the target final Gr pixel 52a (Gr) may be determined based on the values that are determined in the processes illustrated in S105 to S108 and that are determined for the basic pixels 46 existing in a region in a predetermined size centered at the target final Gr Pixel 52a (Gr).

Furthermore, the pixel value determination unit 70 determines the RGB pixel values of the target final Gb pixel 52a (Gb) based on the values determined in the processes illustrated in S105 to S108 and the coefficients acquired in the process illustrated in S109 (S112). Here, for example, the RGB pixel values of the target final Gb pixel 52a (Gb) may be determined based on the values that are determined in the processes illustrated in S105 to S108 and that are determined for the basic pixels 46 existing in a region in a predetermined size centered at the target final Gb pixel 52a (Gb).

Furthermore, the pixel value determination unit 70 determines the RGB pixel values of the target final B pixel 52a (B) based on the values determined in the processes illustrated in S105 to S108 and the coefficients acquired in the process illustrated in S109 (S113). Here, for example, the RGB pixel values of the target final B pixel 52a (B) may be determined based on the values that are determined in the processes illustrated in S105 to S108 and that are determined for the basic pixels 46 existing in a region in a predetermined size centered at the target final B pixel 52a (B).

Furthermore, the pixel value determination unit 70 checks whether or not all of the intermediate pixels 50 are selected as the target intermediate pixels 50a in the process illustrated in S103 (S114).

Here, in a case where the pixel value determination unit 70 confirms that not all of the intermediate pixels 50 are selected as the target intermediate pixels 50a (S114: N), the process returns to S103.

On the other hand, it is assumed that the pixel value determination unit 70 confirms that all of the intermediate pixels 50 are selected as the target intermediate pixels 50a (S114: Y). In this case, the final image generation unit 72 generates the final image 44 based on the RGB pixel values determined in the processes illustrated in S110 to S113 and causes the final image storage unit 74 to store the final image 44 (S115). Furthermore, the process illustrated in the present processing example is finished.

Next, an example of a flow of the sorting process of four values executed by the image processing apparatus 10 according to the present embodiment will be described with reference to a flow chart illustrated in FIG. 12. Note that in the present processing example, the respective four values to be sorted will be referred to as a first value A1, a second value A2, a third value A3, and a fourth value A4.

First, the sorting unit 76 sets the maximum value of the first value A1 and the fourth value A4 as a first intermediate value B1 (S201).

Furthermore, the sorting unit 76 sets the maximum value of the second value A2 and the third value A3 as a second intermediate value B2 (S202).

Furthermore, the sorting unit 76 sets the minimum value of the first value A1 and the fourth value A4 as a fourth intermediate value B4 (S203).

Furthermore, the sorting unit 76 sets the minimum value of the second value A2 and the third value A3 as a third intermediate value B3 (S204).

Furthermore, the sorting unit 76 sets the maximum value of the first intermediate value B1 and the second intermediate value B2 as a first final value C1 (S205).

Furthermore, the sorting unit 76 sets the maximum value of the third intermediate value B3 and the fourth intermediate value B4 as a third final value C3 (S206).

Furthermore, the sorting unit 76 sets the minimum value of the first intermediate value B1 and the second intermediate value B2 as a second final value C2 (S207).

Furthermore, the sorting unit 76 sets the minimum value of the third intermediate value B3 and the fourth intermediate value B4 as a fourth final value C4 (S208).

As a result of the processes, the first final value C1, the second final value C2, the third final value C3, and the fourth final value C4 are sorted in descending order of the value. Therefore, it can be specified that the second largest value is the second final value C2, and the second smallest value is the third final value C3.

Figure 12:
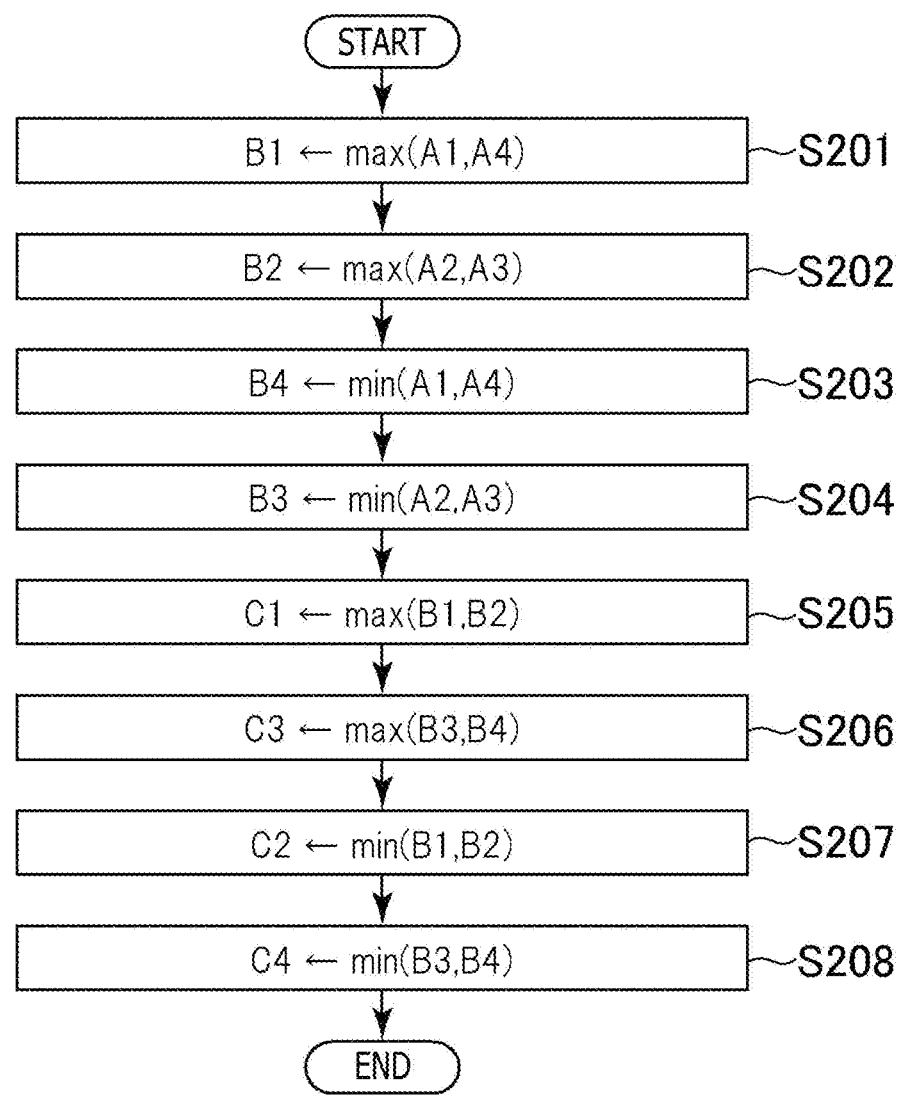
FIG. 12 is a flow chart illustrating an example of a flow of a process executed by the image processing apparatus according to the embodiment of the present invention.

In the sorting process illustrated in FIG. 12, the four values can be sorted in a predetermined number of steps by performing only an arithmetic operation for calculating the maximum value or the minimum value without executing branch processing.

The sorting process of the sorting unit 76 described above may be executed by the CPU 20a or may be executed by the GPU 20b. In addition, the GPU 20b may use the SIMD to execute the sorting process of four sets of four values in parallel. Furthermore, in the case where the CPU 20a is a multi-core processor, the CPU 20a may use the SIMD to execute the sorting process of four sets of four values in parallel.

Note that the process described above can be applied to a process of specifying the second largest value and the second smallest value from five values. Here, for example, it is assumed that there is a fifth value A5 in addition to the first value A1, the second value A2, the third value A3, and the fourth value A4.

In this case, for example, the minimum value of "the maximum value of the first final value C1 and the second final value C2" and "the maximum value of the second final value C2 and the fifth value A5" may be specified after the execution of the process illustrated in S208. In this case, the value specified in this way is the second largest value among the values from the first value A1 to the fifth value A5.

In addition, for example, the minimum value of "the maximum value of the third final value C3 and the fourth final value C4" and "the maximum value of the fourth final value C4 and the fifth value A5" may be specified after the execution of the process illustrated in S208. In this case, the value specified in this way is the second smallest value among the values from the first value A1 to the fifth value A5.

Note that the present invention is not limited to the embodiment.

For example, the functions implemented in the image processing apparatus 10 may be implemented in the camera that generates the basic image 40.

In addition, the present invention can be applied not only to the image of the Bayer array, but also to any image including a plurality of pixel sets 48 each including a plurality of single-color basic pixels 46 arranged in a predetermined color pattern, in which the pixel sets 48 are vertically and horizontally arranged side by side.

In addition, the specific character strings and numerical values described above and the specific character strings and numerical values in the drawings are exemplary, and the character strings and the numerical values are not limited to these.

The invention claimed is:

1. An image processing apparatus that generates a final image based on a basic image including a plurality of pixel sets each including a plurality of single-color basic pixels arranged in a predetermined color pattern, the pixel sets being vertically and horizontally arranged side by side, the final image including a plurality of multi-color final pixels each associated with at least one of the basic pixels, the final image being a color image, the image processing apparatus comprising:
- an intermediate image generation unit that generates, based on the basic image, an intermediate image in which pixel values of a plurality of the basic pixels included in the pixel set are set as values of intermediate pixel data of one intermediate pixel associated with the pixel set;
- a pixel value determination unit that determines pixel values of a plurality of colors of at least one of the final pixels associated with a target intermediate pixel that is one of the intermediate pixels included in the intermediate image based on values of the intermediate pixel data of the target intermediate pixel and values of the intermediate pixel data of the intermediate pixel adjacent to the target intermediate pixel; and
- a final image generation unit that generates the final image based on pixel values of a plurality of colors regarding a plurality of the final pixels.

2. The image processing apparatus according to claim 1, further comprising:
- an interpolation process execution unit that determines pixel values of colors different from a color of the basic pixel regarding the basic pixel included in the pixel set associated with the target intermediate pixel or the intermediate pixel adjacent to the target intermediate pixel, wherein
- the pixel value determination unit determines the pixel values of the plurality of colors of at least one of the final pixels associated with the target intermediate pixel based on coefficients corresponding to the pixel values determined by the interpolation process execution unit, the values of the intermediate pixel data of the target intermediate pixel, and the values of the intermediate pixel data of the intermediate pixel adjacent to the target intermediate pixel.

3. The image processing apparatus according to claim 2, wherein
- the interpolation process execution unit determines, for one of the basic pixels, the pixel values of the colors different from the color of the basic pixel just once.

4. The image processing apparatus according to claim 1, wherein
- the basic image is an image of a Bayer array.

5. The image processing apparatus according to claim 1, wherein
- the pixel set includes an R pixel, G pixels, and a B pixel arranged in a predetermined color pattern.

6. The image processing apparatus according to claim 1, further comprising:
- a sorting unit that sorts a first value, a second value, a third value, and a fourth value into a first final value, a second final value, a third final value, and a fourth final value in descending order, wherein the sorting unit
- sets a larger one of the first value and the fourth value as a first intermediate value,
- sets a larger one of the second value and the third value as a second intermediate value,
- sets a smaller one of the second value and the third value as a third intermediate value,
- sets a smaller one of the first value and the fourth value as a fourth intermediate value,
- sets a larger one of the first intermediate value and the second intermediate value as the first final value,
- sets a smaller one of the first intermediate value and the second intermediate value as the second final value,
- sets a larger one of the third intermediate value and the fourth intermediate value as the third final value, and
- sets a smaller one of the third intermediate value and the fourth intermediate value as the fourth final value.

7. An image processing method of generating a final image based on a basic image including a plurality of pixel sets each including a plurality of single-color basic pixels arranged in a predetermined color pattern, the pixel sets being vertically and horizontally arranged side by side, the final image including a plurality of multi-color final pixels each associated with at least one of the basic pixels, the final image being a color image, the image processing method comprising:
- generating, based on the basic image, an intermediate image in which pixel values of a plurality of the basic pixels included in the pixel set are set as values of intermediate pixel data of one intermediate pixel associated with the pixel set;
- determining pixel values of a plurality of colors of at least one of the final pixels associated with a target intermediate pixel that is one of the intermediate pixels included in the intermediate image based on values of the intermediate pixel data of the target intermediate pixel and values of the intermediate pixel data of the intermediate pixel adjacent to the target intermediate pixel; and
- generating the final image based on pixel values of a plurality of colors regarding a plurality of the final pixels.

8. A non-transitory computer readable medium having stored thereon program for a computer which generates a final image based on a basic image including a plurality of pixel sets each including a plurality of single-color basic pixels arranged in a predetermined color pattern, the pixel sets being vertically and horizontally arranged side by side, the final image including a plurality of multi-color final pixels each associated with at least one of the basic pixels, the final image being a color image,
the program comprising:
- by an intermediate image generation unit, generating, based on the basic image, an intermediate image in which pixel values of a plurality of the basic pixels included in the pixel set are set as values of intermediate pixel data of one intermediate pixel associated with the pixel set;
- by a pixel value determination unit, determining pixel values of a plurality of colors of at least one of the final pixels associated with a target intermediate pixel that is one of the intermediate pixels included in the intermediate image based on values of the intermediate pixel data of the target intermediate pixel and values of the intermediate pixel data of the intermediate pixel adjacent to the target intermediate pixel; and by a final image generation unit, generating the final image based on pixel values of a plurality of colors regarding a plurality of the final pixels.

* * * * *